United States Patent
Deng et al.

(10) Patent No.: US 10,296,482 B2
(45) Date of Patent: May 21, 2019

(54) SYSTEM AND METHOD FOR FLEXIBLE CONNECTION OF REDUNDANT INPUT-OUTPUT MODULES OR OTHER DEVICES

(71) Applicant: Honeywell International Inc., Morris Plains, NJ (US)

(72) Inventors: Shimei Deng, Shanghai (CN); Wen Peng, Shanghai (CN); Fangyin Wan, Shanghai (CN); Lei Zou, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 113 days.

(21) Appl. No.: 15/452,433

(22) Filed: Mar. 7, 2017

(65) Prior Publication Data

US 2018/0260354 A1 Sep. 13, 2018

(51) Int. Cl.
*G06F 13/40* (2006.01)
*H04L 12/40* (2006.01)
*G06F 13/42* (2006.01)
*G05B 19/042* (2006.01)

(52) U.S. Cl.
CPC ...... *G06F 13/4068* (2013.01); *G06F 13/4221* (2013.01); *G05B 19/0423* (2013.01); *G05B 2219/25099* (2013.01)

(58) Field of Classification Search
CPC .................. G06F 13/40; H04L 12/40
See application file for complete search history.

(56) References Cited

U.S. PATENT DOCUMENTS

| 4,058,890 A | 11/1977 | Pierce et al. |
| 4,679,189 A | 7/1987 | Olson et al. |
| 5,537,414 A | 7/1996 | Takiyasu et al. |
(Continued)

FOREIGN PATENT DOCUMENTS

| DE | 4134207 C1 | 4/1993 |
| DE | 10314721 A1 | 11/2004 |
(Continued)

OTHER PUBLICATIONS

Aiello, et al. "Wireless Distributed Measurement System by Using Mobile Device," IEEE Workshop on Intelligent Data Aquisition and Advanced Computing Systems: Technology and Applications, Sep. 5-7, 2005, Sofin, Bulgaria, 4 pages.
(Continued)

*Primary Examiner* — David E Martinez
(74) *Attorney, Agent, or Firm* — Loza & Loza LLP; Luis M. Ortiz; Kermit D. Lopez (57) ABSTRACT

An apparatus includes a first device connector configured to be coupled to a first device. The apparatus also includes a second device connector configured to be coupled to a second device. The apparatus further includes at least two connection arms forming a hinged connection between the first device connector and the second device connector. In addition, the apparatus includes a flexible connector coupled to the first device connector and the second device connector, at least a portion of the flexible connector extending through the at least two connection arms, the flexible connector comprising a flexible printed circuit board assembly (PCBA) or a flexible flat cable (FFC).

20 Claims, 6 Drawing Sheets

(56) References Cited

U.S. PATENT DOCUMENTS

| | | | |
|---|---|---|---|
| 5,566,356 A | 10/1996 | Taketsugu | |
| 5,664,195 A | 9/1997 | Chatterji | |
| 5,749,053 A | 5/1998 | Kusaki et al. | |
| 5,898,826 A | 4/1999 | Pierce et al. | |
| 6,170,044 B1 | 1/2001 | McLaughlin et al. | |
| 6,192,232 B1 | 2/2001 | Iseyama | |
| 6,213,782 B1* | 4/2001 | Derstine | H01R 13/501 439/31 |
| 6,256,297 B1 | 7/2001 | Haferbeck et al. | |
| 6,272,386 B1 | 8/2001 | McLaughlin et al. | |
| 6,292,905 B1 | 9/2001 | Wallach et al. | |
| 6,307,751 B1* | 10/2001 | Bodony | G06F 1/16 361/679.08 |
| 6,374,352 B1 | 4/2002 | Goldman et al. | |
| 6,427,071 B1 | 7/2002 | Adams et al. | |
| 6,437,692 B1 | 8/2002 | Petite et al. | |
| 6,631,416 B2 | 10/2003 | Bendinelli et al. | |
| 6,694,447 B1 | 2/2004 | Leach et al. | |
| 6,701,453 B2 | 3/2004 | Chrabaszcz | |
| 6,751,219 B1 | 6/2004 | Lipp et al. | |
| 6,847,316 B1 | 1/2005 | Keller | |
| 6,850,486 B2 | 2/2005 | Saleh et al. | |
| 6,917,584 B2 | 7/2005 | Kuwabara | |
| 6,963,781 B2 | 11/2005 | Fehrer et al. | |
| 7,031,308 B2 | 4/2006 | Garcia-Luna-Aceves et al. | |
| 7,035,937 B2 | 4/2006 | Haas et al. | |
| 7,058,848 B2 | 6/2006 | Sicola et al. | |
| 7,128,615 B1* | 10/2006 | Liao | H01R 31/06 439/640 |
| 7,172,428 B2* | 2/2007 | Huang | H01R 35/00 439/11 |
| 7,190,961 B2 | 3/2007 | Burr | |
| 7,203,743 B2 | 4/2007 | Shah-Heydari | |
| 7,236,987 B1 | 6/2007 | Faulkner et al. | |
| 7,240,188 B2 | 7/2007 | Takata et al. | |
| 7,275,157 B2 | 9/2007 | Winget | |
| 7,366,114 B2 | 4/2008 | Park et al. | |
| 7,440,735 B2 | 10/2008 | Karschnia et al. | |
| 7,460,865 B2 | 12/2008 | Nixon et al. | |
| 7,620,409 B2 | 11/2009 | Budampati et al. | |
| 7,688,802 B2 | 3/2010 | Gonia et al. | |
| 7,792,126 B1 | 9/2010 | Montestruque et al. | |
| 7,800,875 B2 | 9/2010 | Flay et al. | |
| 7,802,016 B2 | 9/2010 | Eimers-Klose et al. | |
| 7,860,495 B2 | 12/2010 | McFarland | |
| 8,350,691 B2 | 1/2013 | McFarland | |
| 8,498,201 B2 | 7/2013 | Budampati et al. | |
| 8,503,288 B1 | 8/2013 | Howard | |
| 8,582,470 B2 | 11/2013 | Collins et al. | |
| 8,756,412 B2 | 6/2014 | Pulini et al. | |
| 2002/0045969 A1 | 4/2002 | Dierauer | |
| 2002/0072329 A1 | 6/2002 | Bandeira et al. | |
| 2002/0120671 A1 | 8/2002 | Daffner et al. | |
| 2002/0122230 A1 | 9/2002 | Izadpanah et al. | |
| 2002/0176396 A1 | 11/2002 | Hammel et al. | |
| 2003/0003912 A1 | 1/2003 | Melpignano et al. | |
| 2003/0005149 A1 | 1/2003 | Haas et al. | |
| 2003/0177150 A1 | 9/2003 | Fung et al. | |
| 2004/0010694 A1 | 1/2004 | Collens et al. | |
| 2004/0028023 A1 | 2/2004 | Mandhyan et al. | |
| 2004/0029553 A1 | 2/2004 | Cain | |
| 2004/0083833 A1 | 5/2004 | Hitt et al. | |
| 2004/0174829 A1 | 9/2004 | Ayyagari | |
| 2004/0230899 A1 | 11/2004 | Pagnano et al. | |
| 2004/0259533 A1 | 12/2004 | Nixon et al. | |
| 2005/0005200 A1 | 1/2005 | Matena et al. | |
| 2005/0059379 A1 | 3/2005 | Sovio et al. | |
| 2005/0071708 A1 | 3/2005 | Bartfai et al. | |
| 2005/0102562 A1 | 5/2005 | Shinohara et al. | |
| 2005/0141553 A1 | 6/2005 | Kim et al. | |
| 2005/0164684 A1 | 7/2005 | Chen et al. | |
| 2005/0201349 A1 | 9/2005 | Budampati | |
| 2005/0228509 A1 | 10/2005 | James | |
| 2005/0254653 A1 | 11/2005 | Potashnik et al. | |
| 2005/0281215 A1 | 12/2005 | Budampati et al. | |
| 2005/0289553 A1 | 12/2005 | Miki | |
| 2006/0002368 A1 | 1/2006 | Budampati et al. | |
| 2006/0015641 A1 | 1/2006 | Ocko et al. | |
| 2006/0039347 A1 | 2/2006 | Nakamura et al. | |
| 2006/0083200 A1 | 4/2006 | Emeott et al. | |
| 2006/0104301 A1 | 5/2006 | Beyer et al. | |
| 2006/0128349 A1 | 6/2006 | Yoon | |
| 2006/0171344 A1 | 8/2006 | Subramanian et al. | |
| 2006/0171346 A1 | 8/2006 | Kolavennu et al. | |
| 2006/0227729 A1 | 10/2006 | Budampati et al. | |
| 2006/0256740 A1 | 11/2006 | Koski | |
| 2006/0271814 A1 | 11/2006 | Fung et al. | |
| 2006/0274644 A1 | 12/2006 | Budampati et al. | |
| 2006/0274671 A1 | 12/2006 | Budampati et al. | |
| 2006/0282498 A1 | 12/2006 | Muro | |
| 2006/0287001 A1 | 12/2006 | Budampati et al. | |
| 2007/0004471 A1* | 1/2007 | Wang | H01R 35/04 455/575.1 |
| 2007/0022317 A1 | 1/2007 | Chen et al. | |
| 2007/0030816 A1 | 2/2007 | Kolavennu | |
| 2007/0030832 A1 | 2/2007 | Gonia et al. | |
| 2007/0067458 A1 | 3/2007 | Chand | |
| 2007/0073861 A1 | 3/2007 | Amanuddin et al. | |
| 2007/0076638 A1 | 4/2007 | Kore et al. | |
| 2007/0077941 A1 | 4/2007 | Gonia et al. | |
| 2007/0087763 A1 | 4/2007 | Budampati et al. | |
| 2007/0091824 A1 | 4/2007 | Budampati et al. | |
| 2007/0091825 A1 | 4/2007 | Budampati et al. | |
| 2007/0103303 A1 | 5/2007 | Shoarinejad | |
| 2007/0147294 A1 | 6/2007 | Bose et al. | |
| 2007/0153677 A1 | 7/2007 | McLaughlin et al. | |
| 2007/0153789 A1 | 7/2007 | Barker et al. | |
| 2007/0155423 A1 | 7/2007 | Carmody et al. | |
| 2007/0237137 A1 | 10/2007 | McLaughlin | |
| 2007/0261052 A1 | 11/2007 | Bale et al. | |
| 2007/0280178 A1 | 12/2007 | Hodson et al. | |
| 2008/0043637 A1 | 2/2008 | Rahman | |
| 2008/0140844 A1 | 6/2008 | Halpern | |
| 2008/0158831 A1 | 7/2008 | Cox et al. | |
| 2008/0225737 A1 | 9/2008 | Gong et al. | |
| 2008/0267259 A1 | 10/2008 | Budampati et al. | |
| 2008/0273547 A1 | 11/2008 | Phinney | |
| 2009/0022121 A1 | 1/2009 | Budampati et al. | |
| 2009/0034441 A1 | 2/2009 | Budampati et al. | |
| 2009/0060192 A1 | 3/2009 | Budampati et al. | |
| 2009/0086692 A1 | 4/2009 | Chen | |
| 2009/0109889 A1 | 4/2009 | Budampati et al. | |
| 2012/0260127 A1 | 10/2012 | Jibbe et al. | |
| 2013/0268117 A1* | 10/2013 | Staab | B25J 13/087 700/258 |
| 2013/0274900 A1 | 10/2013 | Uhde et al. | |
| 2013/0277506 A1 | 10/2013 | Baldwin et al. | |
| 2014/0078664 A1 | 3/2014 | Lau et al. | |
| 2014/0211661 A1 | 7/2014 | Gorkemli et al. | |
| 2014/0362515 A1 | 12/2014 | Pronozuk et al. | |
| 2015/0271921 A1 | 9/2015 | Hu et al. | |

FOREIGN PATENT DOCUMENTS

| | | |
|---|---|---|
| EP | 1081895 A1 | 7/2001 |
| EP | 1401171 A2 | 3/2004 |
| EP | 1401171 A3 | 3/2004 |
| EP | 1439667 A2 | 7/2004 |
| GB | 2427329 A | 12/2006 |
| WO | 0135190 A2 | 5/2001 |
| WO | 0135190 A3 | 5/2001 |
| WO | 03079616 A1 | 9/2003 |
| WO | 2004047385 A2 | 6/2004 |
| WO | 2004047385 A3 | 6/2004 |
| WO | 2004114621 A1 | 12/2004 |
| WO | 2006017994 A1 | 2/2006 |
| WO | 2006053041 A1 | 5/2006 |

OTHER PUBLICATIONS

Chen, et al. "Dependability Enhancement for IEEE 802.11 Wireless LAN with Redundancy Techniques," Proceedings of the 2003

(56) References Cited

OTHER PUBLICATIONS

International Conference on Dependable Systems and Networks (DSN'03), IEEE Computer Soci4ety, 8 pages.
Dias Pereira, et al. "A Fieldbus Prototype for Educational Purposes," IEEE Instrumentation and Measurement Magazine, vol. 7, Issue 1, Abstract, Mar. 2004, 2 pages.
Dunkels, et al., "Run-Time Dynamic Linking for Reprogramming Wireless Sensor Networks," SenSys'06, Nov. 1-3, 2006, Boulder, Colorado, 14 pages.
"FireFly 2.2 Datasheet," Wireless Sensor Networks, Aug. 20, 2007, 24 pages.
Han, et al , "A Dynamic Operating System for Sensor Nodes," MobiSys '05: The Third International Conference on Mobile Systems, Applications, and Services, USENIX Association, 2005, pp. 163-176.
Hill, et al., "System Architecture Directions for Networked Sensors," ASPLOS-IX, 2002, Cambridge, Massachusetts, 12 pages.
Hill, et al. "The Platforms Enabling Wireless Sensor Networks," Communications of the ACM, Jun. 2004, vol. 47, No. 6, pp. 41-46.
Kolavennu, et al. "WNSIA MAC Layer," ISA SP100 Meeting, Honeywell, Feb. 14, 2007, 24 pages (see esp. p. 17).
Levis, et al., " Mate: A Tiny Virtual Machine for Sensor Networks," ACM ASPLOS-X, 2002, 11 pages.
Mangharam, et al., "FireFly: A Cross-Layer Platform for Real-Time Sensor Networks," Real Time Systems Journal, 2007, 40 pages.
Mangharam, et al., "Voice Over Sensor Networks," RTSS, 2006, 10 pages.
Mangharam, et al., "Embedded Virtual Machines for Robust Wireless Control Systems," 29th IEEE International Conference on Distributed Computing Systems, Jun. 2009, 6 pages.
McLaughlin, et al., "Redundant Process Controllers for Segregated Supervisory and Industrial Control Networks," U.S. Appl. No. 14/272,058, filed May 7, 2014, 35 pages.
Muller, et al., "A Virtual Machine for Sensor Networks," Proceedings of the EuroSys 2007 Conference, Lisbon, Portugal, ACM, 2007, 14 pages.
"Nano-RK: A Wireless Sensor Networking Real-Time Operating System," http://nanork.org/wiki, 3 pages.
Polastre, et al., "Versatile Low POwer Media Access for Wireless Sensor Networks," Sensys '04, Nov. 3-5, 2004, 13 pages.
Rowe, et al., "RT-Link: A Time Synchronized Link Protocol for Energy-Constrained Multi-Hop Wireless Networks," IEEE SECON, 2006, 10 pages.
"Series 8 C300 Controller User's Guide," Release 110, EXDOC-xx11-en-110A, R110, Honeywell Process Solutions, Feb. 2014, 271 pages.
Song, "Fault Recovery Port-Based Fast Spanning Tree Algorithm (FRP-FAST) for the Fault-Tolerant Ethernet on the Arbitrary Switched Network Topology," IEEE, 2001, 8 pages.
Stanley-Marbell, et al., "Scylla: A Smart Virtual Machine for Mobile Embedded Systems," in WMCSA, 2000, 10 pages.
Sun, et al., "An Efficient Deadlock-Free Tree-Based Routing Algorithm for Irregular Wormhole-Routed Networks Based on the Turn Model," Proceedings of the 2004 International Conference on Parallel Processing (ICPP '04), IEEE Computer Society, 2004, 10 pages.
Taherian, et al., "Event Dissemination in Mobile Wireless Sensor Networks," 2004 IEEE International Conference on Mobile Ad-Hoc and Sensor Systems, 2004, pp. 573-575.
"XYR 5000 Wireless Transmitters, Honeywell Solutions for Wireless Data Acquisition and Monitoring," www.acs.honeywell.com, Feb. 2006, 6 pages.
Ye et al. "An Enegery-Efficient MAC Protocol for Wireless Sensor Networks," USC/ISI Technical Report ISI-TR-543, INFOCOM, Jun. 2002, pp. 1-10.
Zhang, et al., "A Learning-Based Adaptive Routing Tree for Wireless Sensor Networks," Journal of Communications, vol. 1, No. 2, May 2006, pp. 12-21.
Foreign Communication From a Related Counterpart Application, PCT Application No. PCT/2006/048334, International Search Report and Written Opinion dated Jul. 5, 2007, 9 pages.
Foreign Communication From a Related Counterpart Application, PCT Application No. PCT/2007/069614, International Search Report and Written Opinion dated Nov. 22, 2007, 9 pages.
Foreign Communication From a Related Counterpart Application, PCT Application No. PCT/2007/069705, International Search Report and Written Opinion dated Apr. 15, 2008, 9 pages.
Foreign Communication From a Related Counterpart Application, PCT Application No. PCT/2007/069710, International Search Report and Written Opinion dated Nov. 27, 2007, 10 pages.
Foreign Communication From a Related Counterpart Application, PCT Application No. PCT/2007/069717, International Search Report and Written Opinion dated Dec. 10, 2007, 10 pages.
Foreign Communication From a Related Counterpart Application, PCT Application No. PCT/2015/041512, International Search Report and Written Opinion dated Apr. 15, 2016, 11 pages.
U.S. Appl. No. 12/628,918, Non-Final Office Action dated Aug. 6, 2014, 19 pages.
International Search Report and Written Opinion of the International Searching Authority for International Patent Application No. PCT/US2018/020903 dated Jun. 15, 2018, 11 pages.

* cited by examiner

SYSTEM AND METHOD FOR FLEXIBLE CONNECTION OF REDUNDANT INPUT-OUTPUT MODULES OR OTHER DEVICES

TECHNICAL FIELD

This disclosure relates generally to forming electrical connections between redundant devices. More specifically, this disclosure relates to a system and method for a flexible connection of redundant input/output (I/O) modules or other devices.

BACKGROUND

Industrial process control and automation systems are often used to automate large and complex industrial processes. These types of systems routinely include various components including sensors, actuators, and controllers. Some of the controllers can receive measurements from the sensors and generate control signals for the actuators.

Process control and automation systems also typically have hardware components participating in control and input/output (I/O) functions. In many process control and automation systems, redundancy is an important factor for helping to maintain continuous operation of an industrial process. Redundancy solutions help to ensure that if a component in a system (such as an I/O module) goes offline or encounters a fault, a redundant component can take over the operations of the faulty component.

SUMMARY

This disclosure provides a system and method for a flexible connection of redundant input/output (I/O) modules or other devices.

In a first embodiment, an apparatus includes a first device connector configured to be coupled to a first device. The apparatus also includes a second device connector configured to be coupled to a second device. The apparatus further includes at least two connection arms forming a hinged connection between the first device connector and the second device connector. In addition, the apparatus includes a flexible connector coupled to the first device connector and the second device connector, at least a portion of the flexible connector extending through the at least two connection arms, the flexible connector comprising a flexible printed circuit board assembly (PCBA) or a flexible flat cable (FFC).

In a second embodiment, a system includes first and second devices. The system also includes a flexible connection device configured to connect the first and second devices. The flexible connection device includes a first device connector configured to be coupled to the first device and a second device connector configured to be coupled to the second device. The flexible connection device also includes at least two connection arms forming a hinged connection between the first device connector and the second device connector. The flexible connection device further includes a flexible connector coupled to the first device connector and the second device connector, where at least a portion of the flexible connector extends through the at least two connection arms, the flexible connector comprising a flexible PCBA or a FFC.

In a third embodiment, a method includes communicating, by a first device with a second device, via a flexible connection device. The flexible connection device connects the first and second devices. The flexible connection device includes (i) a first device connector coupled to the first device, (ii) a second device connector coupled to the second device, (iii) at least two connection arms forming a hinged connection between the first device connector and the second device connector, and (iv) a flexible connector coupled to the first device connector and the second device connector, at least a portion of the flexible connector extending through the at least two connection arms, the flexible connector comprising a flexible PCBA or a FFC. The method also includes communicating, by the first device with at least one external device or system, via the flexible connection device while the flexible connection device is separated from the second device.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
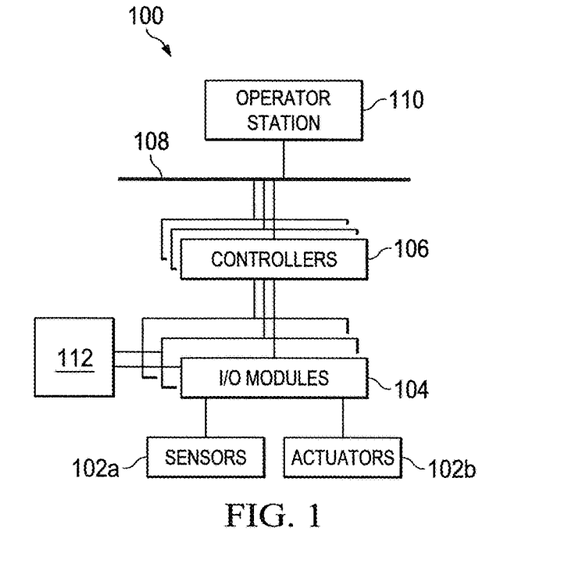
FIG. 1 illustrates a portion of an example industrial process control and automation system according to this disclosure.

FIG. 1 illustrates a portion of an example industrial process control and automation system 100 according to this disclosure. As shown in FIG. 1, the system 100 includes various components that facilitate production or processing of at least one product or other material. For instance, the system 100 can be used to facilitate control or monitoring of components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials or energy in different forms in some manner.

In the example shown in FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one input/output (I/O) module 104 is coupled to the sensors 102a and actuators 102b. The I/O modules 104 facilitate interaction with the sensors 102a, actuators 102b, or other field devices. For example, an I/O module 104 could be used to receive one or more inputs from one or more field devices or to provide one or more outputs to the field device(s). Each I/O module 104 includes any suitable structure(s) for receiving one or more input signals from or providing one or more output signals to one or more field devices.

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. These controllers 106 could interact with the sensors 102a, actuators 102b, and other field devices via the I/O module(s) 104. A second set of controllers 106 could be used to optimize the control logic or other operations performed by the first set of controllers. A third set of controllers 106 could be used to perform additional functions.

Controllers 106 are often arranged hierarchically in a system. For example, different controllers 106 could be used to control individual actuators, collections of actuators forming machines, collections of machines forming units, collections of units forming plants, and collections of plants forming an enterprise. A particular example of a hierarchical arrangement of controllers 106 is defined as the "Purdue" model of process control. The controllers 106 in different hierarchical levels can communicate via one or more networks 108 and associated switches, firewalls, and other components.

Each controller 106 includes any suitable structure for controlling one or more aspects of an industrial process. At least some of the controllers 106 could, for example, represent proportional-integral-derivative (PID) controllers or multivariable controllers, such as Robust Multivariable Predictive Control Technology (RMPCT) controllers or other types of controllers implementing model predictive control (MPC) or other advanced predictive control. As another example, at least some of the controllers 106 could represent programmable logic controllers (PLCs). As a particular example, each controller 106 could represent a computing device running a real-time operating system, a WINDOWS operating system, or other operating system.

Operator access to and interaction with the controllers 106 and other components of the system 100 can occur via various operator stations 110. Each operator station 110 could be used to provide information to an operator and receive information from an operator. For example, each operator station 110 could provide information identifying a current state of an industrial process to an operator, such as values of various process variables and warnings, alarms, or other states associated with the industrial process. Each operator station 110 could also receive information affecting how the industrial process is controlled, such as by receiving setpoints for process variables controlled by the controllers 106 or other information that alters or affects how the controllers 106 control the industrial process. Each operator station 110 includes any suitable structure for displaying information to and interacting with an operator.

In particular embodiments, the various controllers and operator stations in FIG. 1 may represent computing devices. For example, each of the controllers and operator stations could include one or more processing devices and one or more memories for storing instructions and data used, generated, or collected by the processing device(s). Each of the controllers and operator stations could also include at least one to network interface, such as one or more Ethernet interfaces or wireless transceivers.

This represents a brief description of one type of industrial process control and automation system that may be used to manufacture or process one or more materials. Additional details regarding industrial process control and automation systems are well-known in the art and are not needed for an understanding of this disclosure. Also, industrial process control and automation systems are highly configurable and can be configured in any suitable manner according to particular needs.

In many industrial process control and automation systems, such as the system 100, redundancy is an important factor for helping to maintain continuous operation of the system. Redundancy techniques help to ensure that if a component in a system goes offline or encounters a fault, a redundant component can take over the operations of the faulty component. As an example, two or more of the I/O modules 104 may be configured in a redundant configuration. In such a configuration, a first I/O module 104 operates to facilitate interactions between one or more of the controllers 106 and one or more of the sensors 102a and actuators 102b. A second redundant I/O module 104 is available to perform the functions of the first I/O module 104 if the first I/O module 104 goes offline or encounters a fault. In general, a good redundancy solution can be very important for I/O modules or other components since it can reduce overall costs and allow the system to be highly reliable.

Redundancy among I/O modules may have some important configuration requirements in certain applications. For example, in some embodiments, the installation or removal of one I/O module ideally should not affect the operation of another I/O module. As another example, an exchange or switchover from one I/O module to another I/O module should be automatic and rapid. In larger control systems with a number of I/O modules, it can be complex or difficult to configure and maintain a fully-redundant solution among the numerous I/O modules.

In some instances, in order to fully implement redundancy capabilities between two modules, the modules should be able to communicate with each other. For example, in some systems, two I/O modules may need to share one or more physical components that are typically placed or installed on separate boards. One common approach to sharing components is to install two or more redundant I/O modules on a single input/output termination assembly (IOTA) that provides all external connections for the I/O modules, such as a field terminal connector for a field cable. Typically, such a configuration is a low-density configuration, meaning the IOTA board is substantially larger than the footprint of the I/O modules to ensure that the IOTA board has enough physical space to install the multiple I/O modules and the field terminal connector.

Unfortunately, some systems do not have adequate space to implement such a low-density architecture. For example, some systems have a very compact architecture in which I/O modules are positioned very close to each other. These I/O modules may be coupled to a common IOTA or backplane that is configured to connect to multiple I/O modules. Such systems usually feature higher-speed communication capabilities since the multiple I/O modules are connected to the same backplane or IOTA, which has a faster communication throughput than individual cables. In some cases, an IOTA is implemented using a flat, rigid printed circuit board (PCB) that spans across multiple I/O modules, and mating elements on the IOTA engage with an interface on each I/O module in order to create a communication path between the I/O modules and other components of the system. However, the use of a flat, rigid IOTA to connect I/O modules is not ideal in a redundancy-enabled system. This is because it is not possible to unplug and replace one I/O module without completely removing the IOTA from both I/O modules, which interrupts the operation of both I/O modules. Stated differently, neither I/O module can be removed without affecting operation of both I/O modules, which may not be acceptable in critical systems or other systems.

To address these and other issues, various components in the system 100 could be designed or modified to accommodate a flexible connection device 112 for redundant I/O modules or other devices. For example, two of the I/O modules 104 could be arranged as redundant I/O modules, and a flexible connection device 112 can be used to connect the redundant I/O modules 104. The flexible connection device 112 allows either redundant I/O module 104 to be disconnected and removed from the system 100 without affecting operation of the other redundant I/O module 104. Additional details regarding the flexible connection device 112 are provided below.

Although FIG. 1 illustrates one example of an industrial process control and automation system 100, various changes may be made to FIG. 1. For example, the system 100 could include any number of sensors, actuators, I/O modules, controllers, operator stations, networks, flexible connection devices, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment in which a flexible connection for redundant I/O modules or other devices can be used. This functionality can be used in any other suitable system, and the system need not be related to industrial process control and automation.

Figure 2:
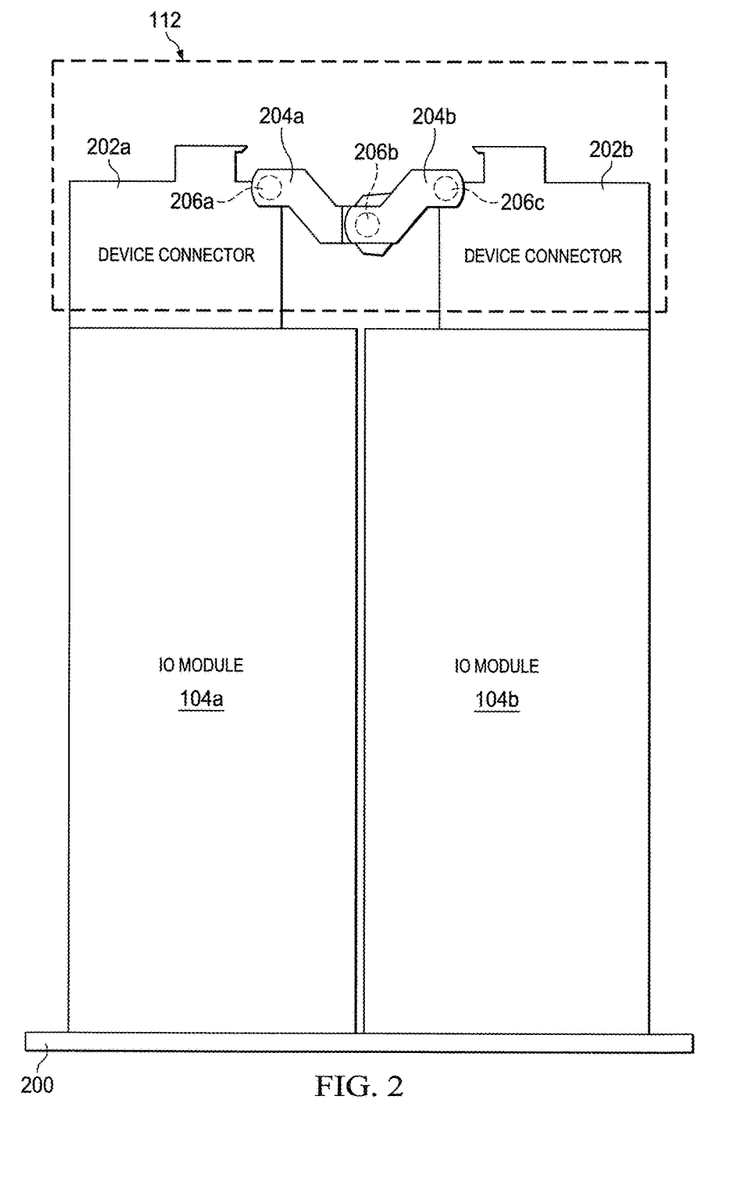
FIGS. 2 and 3 illustrate an example flexible connection device coupling multiple devices according to this disclosure.
Figure 3:
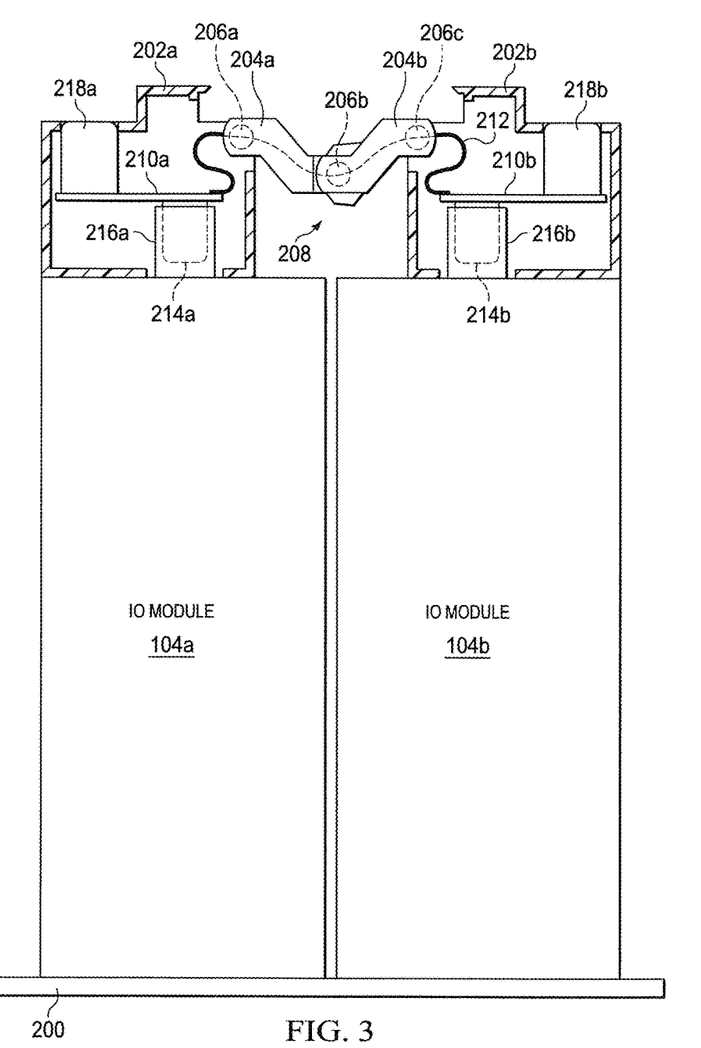

FIGS. 2 and 3 illustrate an example flexible connection device 112 coupling multiple devices according to this disclosure. For ease of explanation, the flexible connection device 112 in FIGS. 2 and 3 is described as being used to couple multiple I/O modules 104a-104b in the system 100 of FIG. 1. However, the flexible connection device 112 could be used with any other suitable devices and in any other suitable system.

As shown in FIGS. 2 and 3, two I/O modules 104a-104b are configured as redundant I/O modules and are positioned adjacent each other. The I/O modules 104a-104b may be installed in a cabinet, frame, or other chassis 200 configured to accommodate multiple I/O modules. While two I/O modules 104a-104b are shown in FIGS. 2 and 3, more than two I/O modules 104a-104b could be used.

The flexible connection device 112 is coupled to both I/O modules 104a-104b and creates a communication path between the I/O modules 104a-104b and other components of the system 100. The flexible connection device 112 includes two device connectors 202a-202b, two connection arms 204a-204b, and three rotary joints 206a-206c that rotatably join the device connectors 202a-202b and the connection arms 204a-204b. The rotary joints 206a-206c allow rotational and translational movement of the device connectors 202a-202b with respect to each other. As described below, this allows one I/O module 104a-104b to be disconnected and removed without affecting operation of the other I/O module 104a-104b. Each of the components 202a-202b, 204a-204b, 206a-206c can be formed from any suitable material(s) and in any suitable manner. In some embodiments, at least portions of the components 202a-202b, 204a-204b, 206a-206c could be formed from one or more rigid, structurally supportive, relatively lightweight materials, such as high-density polyethylene (HDPE) plastic or aluminum.

As shown in the transparent view in FIG. 3, the flexible connection device 112 also includes a flexible connector 208 that is substantially or completely encased within other components of the flexible connection device 112. In some embodiments, the flexible connector 208 includes a flexible printed circuit board assembly (PCBA) that includes two substantially flat PCBs 210a-210b and a flexible PCB 212. Each of the PCBs 210a-210b is encased in one of the device connectors 202a-202b and could be generally rigid or inflexible. The flexible PCB 212 is coupled to both PCBs 210a-210b and passes through the connection arms 204a-204b, thereby creating the flexible PCBA 208 spanning through the components 202a-202b, 204a-204b, 206a-206c of the flexible connection device 112. Each of the flat PCBs 210a-210b and the flexible PCB 212 includes any suitable structure, including wires or other circuitry for transmitting, receiving, or processing data or signals. In some embodiments, the flexible connector 208 additionally or alternatively includes a flexible flat cable (FFC) that includes a plurality of parallel wires arranged in a flat configuration. The flexible connector 208 can replace individual cables that would otherwise be used to connect the I/O modules 104a-104b. For example, the flexible connector 208 can include wires or other circuitry to support a number of communication channels (such as sixteen or more channels of redundant I/O communication) between the I/O modules 104a-104b and with other components of the system 100.

Each device connector 202a-202b respectively includes a mating connector 214a-214b that couples the device connector 202a-202b to an interface 216a-216b on the corresponding I/O module 104a-104b. Each device connector 202a-202b also respectively includes a terminal connector 218a-218b that supports connection of one or more field cables. In this example, each terminal connector 218a-218b is positioned at the top of one of the device connectors 202a-202b, which is similar to the placement of terminal connectors of other I/O modules, so it is convenient for a user to install field cables to the device connectors 202a-202b. Each mating connector 214a-214b and each terminal connector 218a-218b can be installed directly on the PCB 210a-210b. Thus, the PCBs 210a-210b provide a connection to the I/O modules 104a-104b, and the flexible PCB 212 provides a communication path for redundancy operations of the I/O modules 104a-104b. Each mating connector 214a-214b includes any suitable structure for forming an electrical connection with an I/O module or other device, and each terminal connector 218a-218b includes any suitable structure for forming an electrical connection with a field cable or other transmission medium. In some embodiments, the flexible connector 208 could be configured to only provide a connection to the I/O modules 104a-104b and corresponding field devices; in other embodiments, the flexible connector 208 could also include other circuitry for processing data or signals. The circuitry could be located on the PCBs 210a-210b, the flexible PCB 212, or both.

When the system 100 is configured as shown in FIGS. 2 and 3 with the flexible connection device 112 connecting two I/O modules 104a-104b, redundancy functionality can be realized. Moreover, when an operator needs to replace one of the I/O modules 104a-104b, the flexible connection device 112 allows movement of either device connector 202a-202b to detach the mating connector 214a-214b and then rotation of the device connector 202a-202b to allow removal of the disconnected I/O module 104a-104b.

While two connection arms 204a-204b are shown in FIGS. 2 and 3, other embodiments could include more or fewer connection arms 204a-204b. For example, three or more connection arms 204a-204b could allow further degrees of freedom of movement of a device connector 202a-202b that has an irregular shape. Also, while the connection arms 204a-204b allow for freedom of movement within a plane, other embodiments could include ball sockets or joints oriented in other directions to allow freedom of movement in other planes, in a third dimension, or rotational movement about other axes. In addition, while the connection arms 204a-204b are depicted in FIGS. 2 and 3 as having a particular shape, this is merely one example. In other embodiments, one or more connection arms 204a-204b could have a different shape or form.

Although FIGS. 2 and 3 illustrate one example of a flexible connection device 112 coupling multiple devices, various changes may be made to FIGS. 2 and 3. For example, while the I/O modules 104a-104b are depicted vertically with the flexible connection device 112 on top of the I/O modules 104a-104b, the components could be oriented differently, such as when horizontally-mounted I/O modules 104a-104b are used with a flexible connection device 112 connected to a front surface of the I/O modules 104a-104b. Also, FIGS. 2 and 3 illustrates an example environment in which a flexible connection device 112 can be used. This functionality can be used in any other suitable system, such as when the flexible connection device 112 connects other types of devices.

Figure 4:
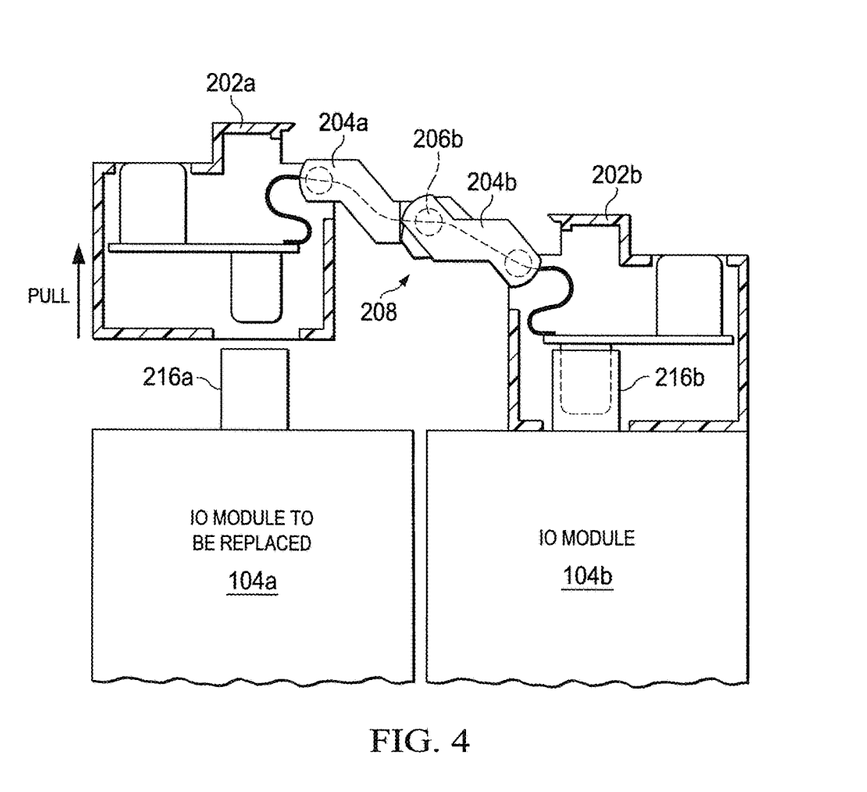
FIGS. 4 through 6 illustrate an example process for replacing one of multiple devices coupled by a flexible connection device according to this disclosure.
Figure 5:
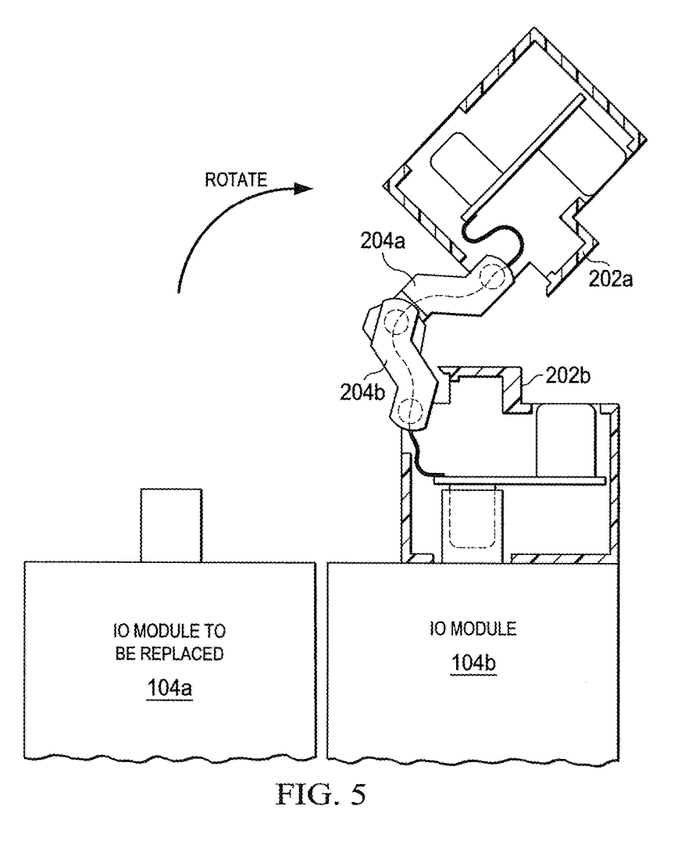
Figure 6:
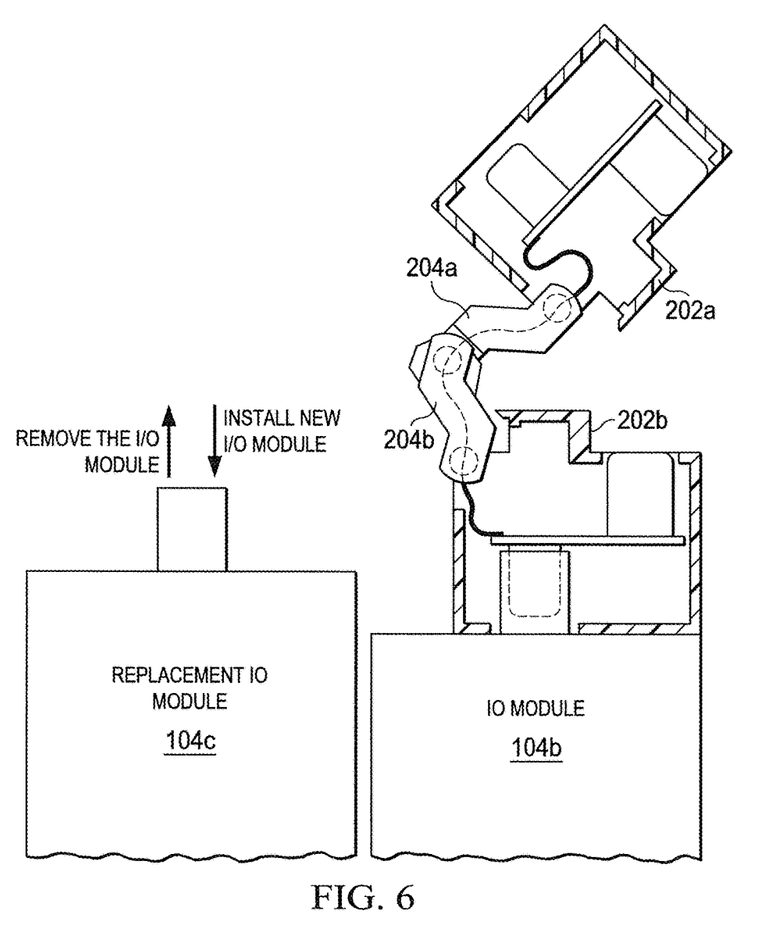

FIGS. 4 through 6 illustrate an example process for replacing one of multiple devices coupled by a flexible connection device 112 according to this disclosure. For ease of explanation, the flexible connection device 112 in FIGS. 4 through 6 is described as being used to couple the I/O modules 104a-104b of FIGS. 2 and 3 in the system 100 of FIG. 1. However, the flexible connection device 112 could be used with any other suitable devices and in any other suitable system.

As shown in FIG. 4, the device connector 202a can be removed from the I/O module 104a, which is being replaced. For example, an operator may grasp the device connector 202a and pull the device connector 202a away from the interface 216a of the I/O module 104a. As this happens, the connection arms 204a-204b pivot at the rotary joints 206a-206c, and the flexible PCB 212 flexes. While this disconnects the I/O module 104a, the I/O module 104b can remain in operation and communicate via the terminal connector 218b. In particular, both terminal connectors 218a-218b can remain in communication with the I/O module 104b.

As shown in FIG. 5, the device connector 202a is rotated and moved away from the I/O module 104a. That is, the operator moves the device connector 202a out of a travel path of the I/O module 104a. The connection arms 204a-204b further pivot here at the rotary joints 206a-206c, and the flexible PCB 212 flexes further. Because the connection arms 204a-204b and rotary joints 206a-206c can be formed of rigid materials, the connection arms 204a-204b can support the weight of the device connector 202a in the extended position shown in FIG. 5 if and when the operator releases the device connector 202a. This allows the operator to perform any other manual task(s) without having to continuously hold or support the device connector 202a. Again, the I/O module 104b can remain in operation and communicate via the terminal connector 218b. In addition, the terminal connector 218a can remain in communication with the I/O module 104b through the flexible connector 208.

As shown in FIG. 6, the I/O module 104a is removed for replacement with an I/O module 104c. With the device connector 202a disconnected and positioned out of the way, the I/O module 104a can be removed from its slot and the I/O module 104c can be inserted into the same slot. Once the new I/O module 104c is inserted, the device connector 202a can be rotated back into position and attached to the new I/O module 104c. Because the device connector 202b remains connected to the I/O module 104b, operation of the I/O module 104b continues without interruption during this entire process, thereby maintaining continuous operation of the system 100.

Although FIGS. 4 through 6 illustrate one example of a process for replacing one of multiple devices coupled by a flexible connection device 112, various changes may be made to FIGS. 4 through 6. For example, this process can be used with any other suitable devices and in any other suitable system, such as when the flexible connection device 112 connects other types of devices.

Figure 7:
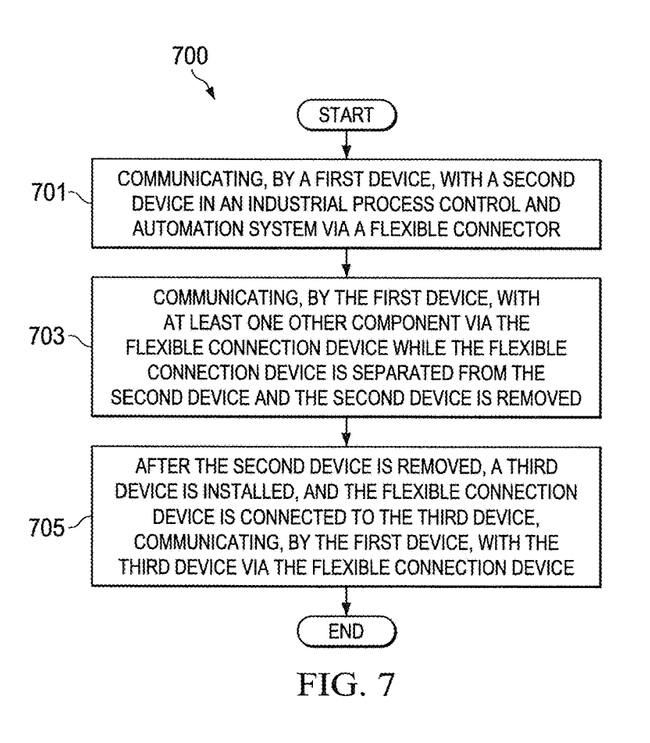
FIG. 7 illustrates an example method for performing one or more functions using a flexible connection device coupling multiple devices according to this disclosure.

FIG. 7 illustrates an example method 700 for performing one or more functions using a flexible connection device coupling multiple devices according to this disclosure. For ease of explanation, the method 700 is described as being performed in the system 100 of FIG. 1 using a flexible connection device 112 configured as described in FIGS. 2 and 3. However, the method 700 could be used with any suitable device or system.

At step 701, a first I/O module communicates with a second I/O module in an industrial process control and automation system via a flexible connection device. This could include, for example, the I/O module 104b of FIG. 2 communicating with the I/O module 104a via the flexible connection device 112. The I/O modules 104a-104b can communicate over a path that includes the device connector 202a, the flexible connector 208, and the device connector 202b.

At step 703, while the flexible connection device is separated from the second I/O module and the second I/O module is removed, the first I/O module communicates with at least one other component in the industrial process control and automation system via the flexible connection device. This could include, for example, the I/O module 104b communicating with a controller 106, a sensor 102a, or an actuator 102b through the device connector 202b of the flexible connection device 112 while the I/O module 104a is removed as shown in FIG. 6.

At step 705, after the second I/O module is removed, a third I/O module is installed as a replacement for the second I/O module, and the flexible connection device is connected to the third I/O module. The first I/O module also communicates with the third I/O module via the flexible connection device. This could include, for example, the I/O module 104b communicating with a new I/O module 104c that replaced the removed I/O module 104a.

Although FIG. 7 illustrates one example of a method 700 for performing one or more functions using a flexible connection device coupling multiple devices, various changes may be made to FIG. 7. For example, the method 700 can be used with any other suitable devices and in any other suitable system, such as when the flexible connection device 112 connects other types of devices.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this to disclosure, as defined by the following claims.

What is claimed is:

1. An apparatus comprising:
a first device connector configured to be coupled to a first device;
a second device connector configured to be coupled to a second device;
at least two connection arms forming a hinged connection between the first device connector and the second device connector; and
a flexible connector coupled to the first device connector and the second device connector, at least a portion of the flexible connector extending through the at least two connection arms, the flexible connector comprising a flexible printed circuit board assembly (PCBA) or a flexible flat cable (FFC),
wherein at least one of the device connectors comprises:
a terminal connector configured to connect to one or more field cables coupled to one or more external devices or systems;
a mating connector configured to connect to an interface of the corresponding first or second device; and
a printed circuit board (PCB) configured to provide a communication pathway between the terminal connector and the mating connector, wherein the PCB is configured to provide the communication pathway when both device connectors are coupled to the first and second devices and when one of the device connectors is disconnected from the corresponding first or second device.

2. The apparatus of claim 1, wherein the flexible connector comprises the PCBA and the PCBA comprises:
a first printed circuit board (PCB) encased in the first device connector;
a second PCB encased in the second device connector; and
a flexible PCB connecting the first and second PCBs.

3. The apparatus of claim 1, further comprising:
a first rotary joint configured to rotatably couple a first of the connection arms to the first device connector;
a second rotary joint configured to rotatably couple a second of the connection arms to the second device connector; and
a third rotary joint configured to rotatably couple the first connection arm to the second connection arm.

4. The apparatus of claim 1, wherein the at least two connection arms are configured to allow one of the device connectors to be disconnected and rotated away from one of the first and second devices.

5. The apparatus of claim 4, wherein another of the device connectors that remains connected to another of the first and second devices is configured to allow the other of the first and second devices to continue communicating with an external device or system through the device connector.

6. The apparatus of claim 1, wherein the apparatus is configured to couple redundant input/output (I/O) modules configured for at least one I/O function in an industrial process control and automation system.

7. The apparatus of claim 1, wherein the terminal connector is disposed on a top surface of the at least one device connector.

8. The apparatus of claim 1, wherein the at least two connection arms comprise three or more connection arms.

9. A system comprising:
first and second devices; and
a flexible connection device configured to connect the first and second devices, the flexible connection device comprising:
a first device connector configured to be coupled to the first device;
a second device connector configured to be coupled to the second device;
at least two connection arms forming a hinged connection between the first device connector and the second device connector; and
a flexible connector coupled to the first device connector and the second device connector, where at least a portion of the flexible connector extends through the at least two connection arms, the flexible connector comprising a flexible printed circuit board assembly (PCBA) or a flexible flat cable (FFC),
wherein at least one of the device connectors comprises:
a terminal connector configured to connect to one or more field cables coupled to one or more external devices or systems;
a mating connector configured to connect to an interface of the corresponding first or second device; and
a printed circuit board (PCB) configured to provide a communication pathway between the terminal connector and the mating connector, wherein the PCB is configured to provide the communication pathway when both device connectors are coupled to the first and second devices and when one of the device connectors is disconnected from the corresponding first or second device.

10. The system of claim 9, wherein the flexible connector comprises the PCBA and the PCBA comprises:
a first printed circuit board (PCB) encased in the first device connector;
a second PCB encased in the second device connector; and
a flexible PCB connecting the first and second PCBs.

11. The system of claim 9, wherein the flexible connection device further comprises:
a first rotary joint configured to rotatably couple a first of the connection arms to the first device connector;
a second rotary joint configured to rotatably couple a second of the connection arms to the second device connector; and
a third rotary joint configured to rotatably couple the first connection arm to the second connection arm.

12. The system of claim 9, wherein the at least two connection arms are configured to allow one of the device connectors to be disconnected and rotated away from one of the first and second devices.

13. The system of claim 12, wherein another of the device connectors that remains connected to another of the first and second devices is configured to allow the other of the first and second devices to continue communicating with an external device or system through the device connector.

14. The system of claim 9, wherein the first and second devices comprise redundant input/output (I/O) modules configured for at least one I/O function in an industrial process control and automation system.

15. The system of claim 9, wherein the terminal connector is disposed on a top surface of the at least one device connector.

16. The system of claim 9, wherein the at least two connection arms comprise three or more connection arms.

17. A method comprising:
communicating, by a first device with a second device, via a flexible connection device, the flexible connection device connecting the first and second devices, the flexible connection device comprising (i) a first device connector coupled to the first device, (ii) a second device connector coupled to the second device, (iii) at least two connection arms forming a hinged connection between the first device connector and the second device connector, and (iv) a flexible connector coupled to the first device connector and the second device connector, at least a portion of the flexible connector extending through the at least two connection arms, the flexible connector comprising a flexible printed circuit board assembly (PCBA) or a flexible flat cable (FFC); and
communicating, by the first device with at least one external device or system, via the flexible connection device while the flexible connection device is separated from the second device;
wherein the first device connector comprises (i) a terminal connector connected to one or more field cables coupled to the at least one external device or system, (ii) a mating connector connected to an interface of the first device, and (iii) a printed circuit board (PCB) that provides a communication pathway between the terminal connector and the mating connector, wherein the PCB provides the communication pathway when the flexible connection device is connected to the first and second devices and when the flexible connection device is separated from the second device.

18. The method of claim 17, wherein communicating, by the first device with the second device, comprises communicating over a path comprising the first device connector, the flexible connector, and the second device connector.

19. The method of claim 17, wherein:
the first and second devices are redundant input/output (I/O) modules configured to perform at least one I/O function in an industrial process control and automation system; and
the first I/O module communicates with the at least one external device or system in the industrial process control and automation system while the flexible connection device is separated from the second I/O module.

20. The method of claim 17, further comprising:
replacing the second device with a third device;
connecting the flexible connection device to the third device; and
communicating, by the first device with the third device, via the flexible connection device.

* * * * *